Aug. 1, 1950 — F. HECHT — 2,516,985
FOOD SERVING APPARATUS
Filed Dec. 23, 1947 — 2 Sheets-Sheet 1
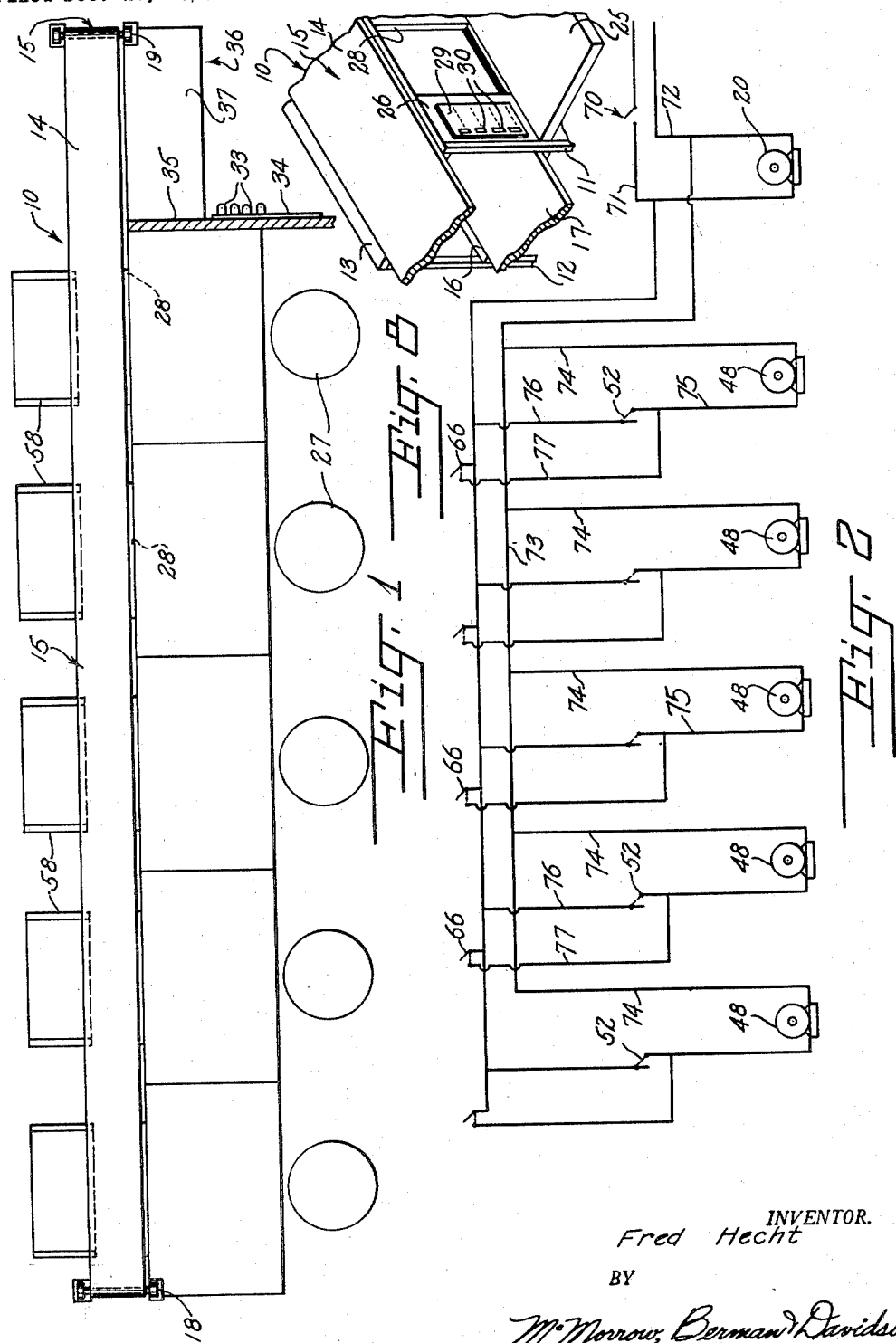
INVENTOR.
Fred Hecht
BY
McMorrow, Berman & Davidson
Attorneys

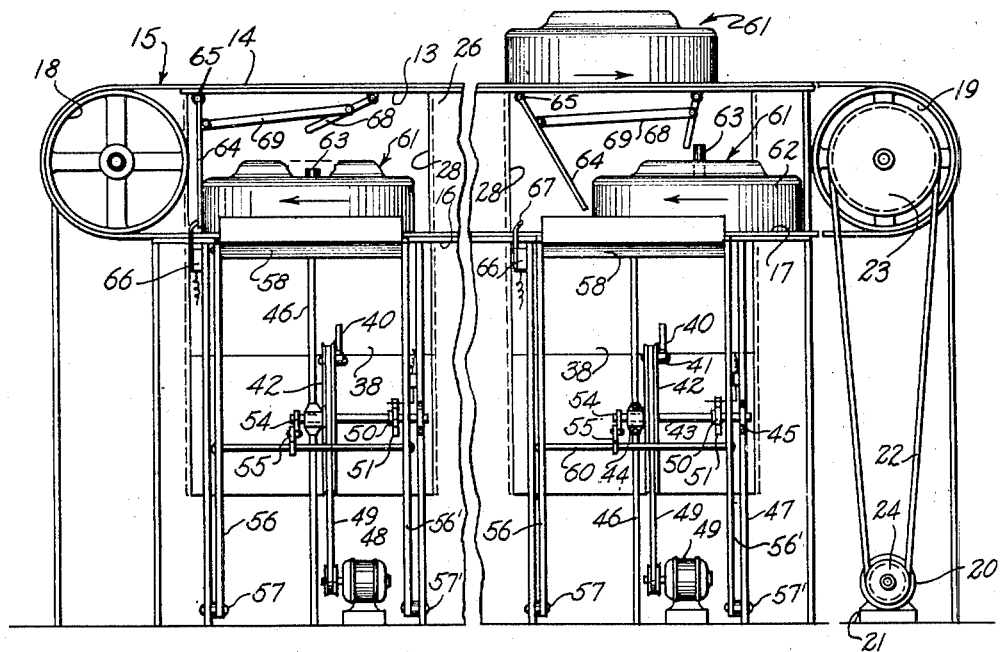
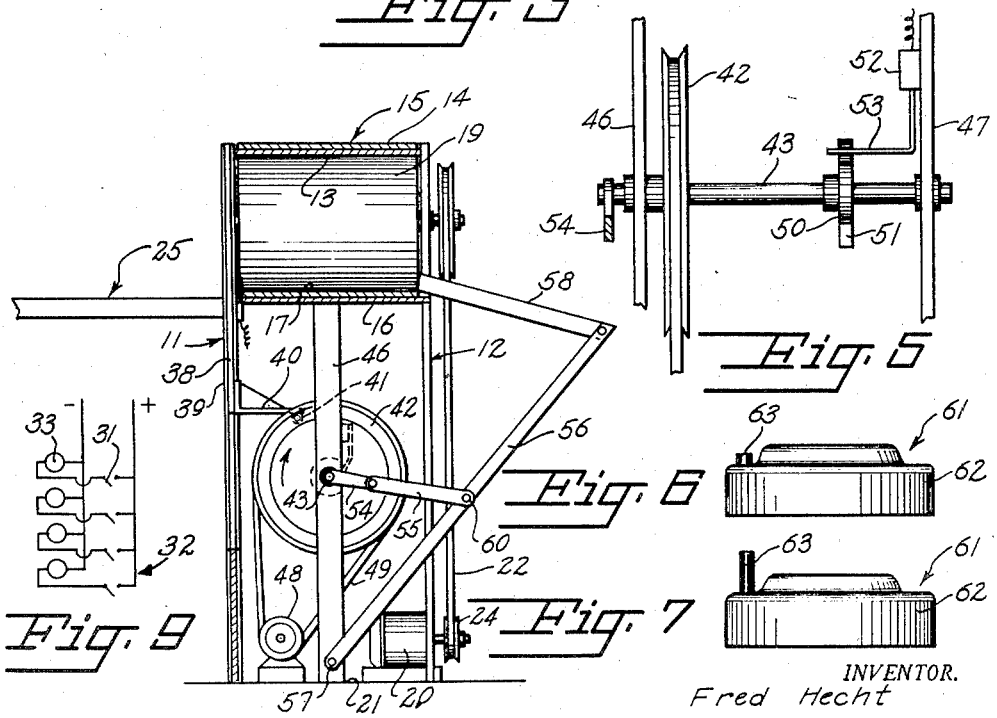

Patented Aug. 1, 1950

2,516,985

UNITED STATES PATENT OFFICE 2,516,985

FOOD SERVING APPARATUS

Fred Hecht, Clarkston, Wash.

Application December 23, 1947, Serial No. 793,349

5 Claims. (Cl. 198—38)

This invention relates to apparatus for transporting objects by conveyor to selected stations along the conveyor and removing the objects from the conveyor at such stations without stopping the conveyor, and more particularly to means of this nature, especially although not necessarily, for transporting and delivering food orders from a restaurant kitchen to selected stations along a lunch counter and returning the soiled eating utensils to the kitchen after use.

The primary object of the invention is to provide apparatus of the character indicated above which is outstandingly simpler in the construction and arrangement of its component parts, has fewer of such parts and is cheaper to manufacture and install and operate.

Another important object of the invention is to provide electrically operated, semi-automatic apparatus of the above indicated character which can be better and more easily sanitized and which effects speedier serving of the food, with less service help, and in a more appetizing condition.

Other important objects and advantages of the invention will be apparent from the following description and accompanying drawings, wherein for illustrative purposes only, a presently preferred embodiment of the invention is set forth in detail.

In the drawings:

Figure 1 is a top plan view, partly in section, showing a lunch counter apparatus in accordance with the present invention.

Figure 2 is a schematic wiring diagram showing the electrical connections between the electrical components of the apparatus.

Figure 3 is a longitudinally contracted rear elevation of the apparatus.

Figure 4 is a transverse vertical section taken therethrough.

Figure 5 is an enlarged fragmentary elevational detail, partly in section.

Figure 6 is a side elevation of one form of food container.

Figure 7 is a side elevation of another form of food container.

Figure 8 is a fragmentary front perspective view, showing one of the lunch counter stations and the coin slots for selective indication of menu items.

Figure 9 is a fragmentary schematic wiring diagram showing the electrical connections between the coin-operated switches and the menu selection indicating lamps in the kitchen.

Referring in detail to the drawings, it will be obvious that while for purposes of disclosure herein, a lunch counter apparatus is shown. The invention is also applicable to the transporting to and delivery at preselected stations along the conveyor, of a variety of objects other than food.

The illustrated lunch counter apparatus comprises, as shown in Figures 3, 8, and 9, a longitudinally elongated counter 10 composed of front and rear vertical frames 11 and 12, respectively, the upper ends of the frames being joined to and supporting an upper horizontal bed 13 for the upper flight 14 of an endless conveyor belt 15, with a lower horizontal bed 16 similarly supported below the bed 13, for supporting the lower flight 17 of the belt. The belt 15, as shown in Figure 3, is at one end trained over an idler roller 18 supported on the adjacent end of the counter structure, and has its opposite end trained over a driven roller 19 similarly supported at the opposite end of the counter structure and driven by a small electric motor 20 secured to the floor or other suitable support 21, through the medium of a belt 22 trained over pulleys 23 and 24 on the roller 19 and motor, respectively, whereby the upper flight of the conveyor belt 15 moves continuously in the direction of the arrow while the motor 20 is running.

The front framework 11 includes a horizontal shelf-counter 25 projecting forwardly therefrom substantially on the same level as the top of the lower belt flight 17, and front panelling 26, which in front of each of the stools 27 has a delivery opening 28. At one side of each such opening 28 the panelling 26 has a menu plate 29 containing a plurality of coin slots 30, opposite which the food selections subject to order are set forth, so that a lunch customer can drop a coin in a selected slot and operate a switch 31 in an electric circuit 32, shown in Figure 9, which includes selection indicator bulbs 33, located on a panel 34 located on the off side of a transverse wall member 35 at the kitchen end of the counter 25 and forming part of the kitchen 36, thereby notifying the cook or other attendant in the kitchen, of the food selection made and the station on the lunch counter at which it is to be delivered when ready. The kitchen, as shown in Figure 1, includes the table 37 alongside of the portion of the conveyor belt 15 which extends beyond the adjacent end of the counter 25, from which table the ready food orders can be easily and quickly transfered to the conveyor belt in the desired order.

For each panelling opening 28 a vertically slidable door 38 is provided, which is normally in an elevated closed position and as shown in Figure 4, has its side edges slidable in grooves formed in vertical members 39 of the front framework 11, and is provided on the lower edge with a lifting bracket 40 which projects rearwardly therefrom for engagement thereunder of a roller 41 projecting laterally from the peripheral part of a pulley wheel 42 which is fixed on a horizontal axle 43 supported parallel to the counter structure in bearings 44 and 45 on vertical members 46 and 47 respectively, which are positioned intermediate the front and rear frameworks 11 and 12 and secured to and between the lower belt flight bed 16 and the floor 21. The pulley wheel 42 turns in a clockwise direction, as viewed in Figure 4, and in its starting position, shown in this figure, the roller 41 is positioned under the door elevating bracket 40 with the door 38 in its elevated, closed position with respect to the delivery opening 28.

Each pulley wheel 42 is driven, clockwise in Figure 4, by a small electric motor 48 mounted on the floor 21, through a belt 49. The axle 43 has a cam 50 thereon, of substantially three-quarter circular contour interrupted by a depression 51, which operates a normally closed switch 52 in the circuit of the motor 48, said switch being mounted on the standard 47, as shown in Figure 5 and having an L-shaped operating arm 53 engaged with the cam 50. The arm 53 rides on the high part of the cam while the pulley wheel 42 is moving through a revolution, starting from the door upholding position shown in Figure 4 and ending with its return thereto, whereupon the switch arm 53 falls into the cam depression 51 and opens the switch 52 thereby stopping the motor 48.

At the outer side of the standard 46 the axle or shaft 43 has a crankarm 54, the outer end of which is pivoted to one end of a pitman or connecting rod 55 whose opposite end is pivoted to an intermediate part of a rearwardly inclined arm 56, pivoted at its lower end at 57 to the standard 46 and pivoted at its upper end to the rear part of the pusher 58. The pusher 58 is generally rectangular in shape and has side-rails 59, and tilts and slides on the lower conveyor flight 17, as shown in Figure 4. Another arm 56' like the arm 56 is pivoted at 57' to the standard 47 and has its upper end pivoted to the opposite side of the pusher 58, as shown in Figure 3. The pivot connecting the pitman 55 with the arms 56 and 56' is constituted by a rod 60 extending between these arms.

The food to be delivered through selected ones of the openings 28 from the kitchen 36, is contained in covered containers 61, whose tops 64 have variously located posts 63 of different height. In Figure 6 the post 63 is forwardly located and of low height, and in Figure 7, the post 63 is similarly located, but of greater height. Other positions of the posts 63 are shown in Figure 3. The location and height of the posts 63 predetermine the openings 28 through which the containers 61 become delivered onto the counter 25 by the forward pushing of the related pushers 58 with the related doors 38 opened.

The delivery operations are initiated by mechanism at each counter station suspended from the upper belt flight bed 13, consisting of a stop gate 64 pivoted at 65 to swing downwardly from a normally inclined position to the perpendicular position, shown at the left in Figure 3 from a normal horizontal position, in order to stop the progress of the related container 61 along the lower flight 17 of the conveyor belt 15, which continues to move, toward the left in Figure 3, at the station corresponding to the particular container, and operate a normally open switch 66 mounted on the adjacent framework. The gate stop 64 is moved down to be engaged by the container 61 and pushed into the perpendicular position and further to operate the arm 67 of the switch 66, by a short lever 68 pivoted to depend from the bed 13 in advance of the stop gate 64 and connected to the stop by a pivoted link 69, the levers 68 being differently positioned to correspond with the location and height of the posts 63 on the containers. The closing of the switch 66 starts the corresponding motor or motors 48 whereby the corresponding pushers 58 are thrust forwardly from the position shown in Figure 4, with the doors 38 open, whereby the corresponding containers 61 are pushed off the lower belt flight 17 onto the counter 25. As soon as this has been accomplished, the pushers 58 withdraw to the position of Figure 4 and the related door 38 is raised to closed position and the motor 48 is cut off.

The prepared containers 61 are placed by the kitchen attendant upon the lower belt flight 17 within the kitchen 36. When a counter customer has finished his food he can place the container 61 on the upper belt flight 14, whereby the container is returned to the kitchen 36.

Referring to the wiring diagram of Figure 2, it will be evident that when the main power line switch 70 is closed, the conveyor belt driving motor 20 is started so as to operate the conveyor belt continuously while the switch 70 is closed. However, the door opening and container delivering motors 48 do not then operate, due to the open condition of the cam operated switches 52 and the container stop gate operated switches 66. As shown in Figure 2, the power lines 71 and 72 are connected to opposite sides of the belt driving motor 20, with the switch 70 connected in the line 71. A wire 73 leading from the line 72 is connected to one side of all of the motors 48 by branch wires 74, and a wire 75 leading from the line 71 is connected to the remaining side of the motors 48 by two branches 76 and 77, the branches 77 containing the stop operated switches 66 and the branches 76 containing the cam operated switches 52. The signal circuit 32 shown in Figure 9, may be on a separate power circuit or connected in some suitable manner to the power lines 71 and 72.

The components of the apparatus as above described are so coordinated that a selected container 61 placed on the lower belt flight 17 in the kitchen 36 will be carried along the counter 25, with the container passing all the stations and their delivery openings 28 without operating the trip levers 68 and switches 66 thereof until the container reaches the particular station for which it is destined by the height and positioning of its station selecting post 63, whereat the container post operates the rip lever 68. The stop gate 64 is thereby let down in front of the container and the lower belt flight 17 carrying the container continues to move the container forwardly while engaged with the gate until the gate approaches perpendicular position and engages the spring arm 67 of the switch 66 whereby the related motor 48 is started and produces dropping of the related door 38 followed by deposit of the container 61 therebehind upon the counter 25 by the pusher 58. The motor 48 continues to operate, so that the door 38 is raised to closed position and the pusher 58 returned to starting position, until the cam switch 52 is operated to shut off the motor 48, in which condition the components are again ready for operation. It will be understood that as the container 61 is pushed off the lower belt flight 17, the gate 64 is freed to resume its inclined position, whereby the spring arm 67 of the switch 66 is freed to resume its normally open switch position.

What is claimed is:

1. Apparatus for transporting bodies of distinctive conformation and delivering the same at preselected stations, said apparatus comprising a conveyor, a receiving platform extending alongside of said conveyor, a plurality of delivery stations spaced therealong, means continuously feeding said conveyor in one direction, and delivering means at each of said stations for moving the bodies off said conveyor onto preselected ones of said stations, said delivering means comprising pusher means for engaging the bodies and pushing the same across said conveyor and onto the preselected stations, trip means at each of said stations affected only by bodies of a certain conformation and a body stopping gate actuated by said trip means engageable with said body for halting further movement of said body by said conveyor belt, for operating said pusher means.

2. Apparatus for transporting bodies of distinctive conformation and delivering the same only at stations corresponding to certain of the conformations, said apparatus comprising an endless conveyor belt, means continuously driving said belt, a platform along said belt having a plurality of stations therealong to receive said bodies from said belt, and delivering means at each of said stations comprising motor-driven pusher means for pushing bodies across said belt and onto the related station used and then withdrawing to inoperative position, trip mechanism operatively connected to the corresponding pusher means, a trip element carried by said trip mechanism and operable only by bodies of a related conformation destined for delivering at the particular station, a body stopping gate swingably supported on said platform and operatively connected to said trip element, said gate normally occupying an elevated out-of-the-way position and actuable upon operation of said trip element to subside to a position in front of the related body to thereby halt further forward movement of said related body by said conveyor belt.

3. Apparatus for transporting bodies of distinctive conformation and delivering same only at stations corresponding to certain of the conformations, said apparatus comprising an endless conveyor belt, means continuously driving said belt, a platform along said belt having a plurality of stations along the length of said belt to receive said bodies from said belt, and delivering means at each of said stations comprising motor-driven pusher means for pushing bodies across said belt and onto the related station, then withdrawing to inoperative position, trip mechanism operatively connected to the corresponding pusher means, a trip element carried by said trip mechanism operable only by bodies of a related conformation for delivery at the particular station, said trip mechanism further comprising a body stopping gate operatively connected to said trip element, said gate normally occupying an elevated out-of-the-way position in front of the related body to halt further forward movement of said related body by said conveyor belt, and means coordinating the operation of said trip mechanism with the operation of said pusher means whereby said body is halted by said gate in advance of operation of said pusher means.

4. Apparatus for transporting bodies and delivering selected ones of said bodies to different related stations, said apparatus comprising a framework having a delivery platform having a plurality of delivery stations spaced therealong, an endless conveyor belt supported along said platform, means continuously driving said belt in one direction, delivery mechanism for each station comprising a pusher for pushing bodies off said belt and onto said platform, a trip mechanism for each station comprising a trip lever and a stop gate operated by said trip lever, said stop gate normally occupying a position out of the way of bodies advanced along said platform on said conveyor belt, containers having station selecting projections thereon of different size and location for conveying said bodies on said conveyor belt, the trip levers of said trip mechanism being of sizes and locations to be operated by containers having projections corresponding thereto so as to place the related stop gates in front of and thereby halt the related containers at the related stations, means arranged to drive said delivery mechanism, and means operated by said trip mechanism in the operated position of said trip mechanism for operating said drive means whereby said delivering mechanism is operated to operate said pusher to push the halted bodies off the conveyor belt and onto the platform, at the preselected station.

5. Apparatus for transporting bodies of distinctive conformation and delivering the same only at selected stations, said apparatus comprising an endless conveyor belt, means continuously driving said belt, a platform along said belt, a plurality of stations along the length of said platform to receive said bodies from said belt, delivery means at each of said stations comprising a motor-driven pusher means for pushing bodies across said belt and onto the related station, then withdrawing to inoperative position and trip mechanism operatively connected to the corresponding pusher means, said trip mechanism including a movable gate engageable with said bodies for halting movement of a selected body by said conveyor and a trip element operable only by bodies of a related conformation connected to said gate for actuating said gate to body engaging position.

FRED HECHT.

REFERENCES CITED

The following references are of record in the file of this patent:

UNITED STATES PATENTS

| Number | Name | Date |
|---|---|---|
| 1,227,027 | Baily | May 22, 1917 |
| 1,697,129 | McCann | Jan. 1, 1929 |
| 1,722,342 | St. John | July 30, 1929 |
| 1,760,030 | Alger | May 27, 1930 |
| 1,881,895 | Olson | Oct. 11, 1932 |